United States Patent [19]

Magill et al.

[11] Patent Number: 5,345,818
[45] Date of Patent: Sep. 13, 1994

[54] WIND DRIVEN DYNAMIC MANIPULATOR FOR A WIND TUNNEL

[75] Inventors: John C. Magill, Norcross; Narayanan M. Komerath, Alpharetta, both of Ga.

[73] Assignee: Georgia Tech Research Corporation, Atlanta, Ga.

[21] Appl. No.: 81,135

[22] Filed: Jun. 25, 1993

[51] Int. Cl.$^5$ ............................................. G01M 9/00
[52] U.S. Cl. ...................................... 73/147; 73/170.05
[58] Field of Search ...................... 73/147 (U.S. only), 73/170.05

[56] References Cited

U.S. PATENT DOCUMENTS

| | | |
|---|---|---|
| 3,010,315 | 11/1961 | Leslie .............................. 73/170.05 |
| 3,447,369 | 6/1969 | Horanoff . |
| 3,456,503 | 7/1969 | Wise . |
| 3,552,201 | 1/1971 | Horanoff . |
| 3,554,028 | 1/1971 | Horanoff . |
| 3,561,264 | 2/1971 | Needham et al. . |
| 3,587,306 | 6/1971 | Bryan . |
| 3,613,443 | 10/1971 | Curry . |
| 3,695,101 | 10/1972 | Hanson . |
| 3,866,467 | 2/1975 | Horanoff . |
| 4,033,185 | 7/1977 | McNally et al. . |
| 4,074,567 | 2/1978 | Horsnoff . |
| 4,091,665 | 5/1978 | Fletcher et al. . |
| 4,107,986 | 8/1978 | Jones . |
| 4,112,752 | 9/1978 | Häfner et al. . |
| 4,116,056 | 9/1978 | Bulychev et al. . |
| 4,475,385 | 10/1984 | Farmer . |
| 4,658,635 | 4/1987 | Pzsolla et al. . |
| 4,688,421 | 8/1987 | Pzsolla . |
| 5,020,364 | 6/1991 | Manitt et al. ........................ 73/147 |

OTHER PUBLICATIONS

Rotary-Balance Technique, Chapter 2, "Rotary Balance Testing of Aircraft Dynamics", Report of Fluid Dynamics Panel Working Group 11, AGRAD Advisory Report No. 265.

"A Review of Techniques for Determination of Dynamic Stability Parameters in Wind Tunnels", AGRAD-LS-114, (1981), written by K. Orlik-Ruckemann, National Research Council Canada, Ottawa, Ontario, Canada.

Primary Examiner—Richard E. Chilcot, Jr.
Assistant Examiner—Joseph L. Felber
Attorney, Agent, or Firm—Fisher & Associates

[57] ABSTRACT

A wind driven aerodynamic manipulator is provided for imparting motion to an aerodynamic model located in a wind tunnel. The manipulator comprises a support for supporting an aerodynamic body within a wind tunnel; a first aerodynamic surface affixed to the support in such a manner as to allow motion to be imparted to the aerodynamic body by an interaction between the first aerodynamic surface and a fluid flow within the wind tunnel; and a first controller for orienting the first aerodynamic surface with respect to the fluid flow. Additionally, a multi-dimensional manipulator is also disclosed.

16 Claims, 2 Drawing Sheets

WIND DRIVEN DYNAMIC MANIPULATOR FOR A WIND TUNNEL

This invention is made with government support under contract number F49620-93-1-0036 (project number E16-M65), awarded by the U.S. Air Force. The government has certain rights in this invention.

BACKGROUND OF THE INVENTION

1. Field of the Invention

The present invention relates generally to a manipulator for aerodynamic investigations of models in a wind tunnel, and more particularly to a manipulator which allows manipulation of the model by the interaction of wind within the wind tunnel and the manipulator.

2. Description of the Prior Art

Model scale information on aerodynamic characteristics may be gathered by aeroballistic or hypervelocity range tests, outdoor free fight tests, spin tunnel experiments or dynamic experiments in wind tunnels. These tests are mainly used for visual studies of the air flow characteristics and the forces of the aircraft model. Generally, the preferred method of testing incorporates the use of a wind tunnel. A model may be either a captive model, i.e., mechanically secured to a mounting platform or support arm, or a free model.

Future aircraft designs will include the capability to maneuver under extreme conditions, where conventional aerodynamic controls are not sufficient. Such "post stall" maneuvering concepts envision finite rate, asymmetric flow interactions to improve pointing and evasion capability. Many of the new flow interactions and opportunities cannot yet be flight tested because existing aircraft technology does not permit such maneuvers to take place. Devices presently used to perform simulations of maneuvers in the wind tunnel are massive and designed for specific motions, and are unsuitable for all but the easiest of maneuvers.

This application deals mainly with captive models. Known simulators for aerodynamic investigations of captive models in a wind tunnel include a multipart support arm, the parts of which are mounted in relation to each other by means of bearings. The support arm is adjusted by a spindle transmission system, electric motors or positioning cylinders to provide motion to the captive model. Generally, these simulators are restricted to at most two degrees of freedom. The following U.S. Patents illustrate various constructions for support arms and other wind tunnel equipment which imparts motion to a model.

U.S. Pat. No. 4,688,421, by Pzsolla, discloses a rear support balance body which is utilized in a wind tunnel. The balance body is composed of an action beam and a reaction beam. The balance body is inserted between a model and a mounting for the model.

U.S. Pat. No. 4,658,635, by Pzsolla et al., discloses a simulator for aerodynamic tests in a wind tunnel. Linear cylinders are provided to generate motion of the model.

U.S. Pat. No. 4,475,385, by Farmer, discloses a model mounting system which provides motion via a tunable mounting plate.

U.S. Pat. No. 4,116,056, by Bulychev et al., discloses a mounting system for aerodynamic models which utilizes a plurality of elastic suspension lines. A hoisting mechanism is attached to the suspension lines and provides motion to the model.

U.S. Pat. No. 4,112,752, by Häfner et al., discloses an apparatus for measuring force components upon aerodynamic models. The device includes three orthogonally disposed bearing members which provide motion to the model.

U.S. Pat. No. 4,091,665, by Fletcher et al., discloses a wind tunnel reaction control model block. The block includes a plurality of thrusting nozzles which may be configured in various combinations to simulate particular thrust characteristics.

U.S. Pat. No. 4,107,986, by Jones, discloses a strain gage balance having fixed beams upon which strain gages are attached.

U.S. Pat. No. 4,074,567, by Horanoff, discloses a wind tunnel balance. This balance utilizes deflection beams to reduce the interaction between the beam and an air flow in a wind tunnel. The deflection beams do not provide any movement to a model within the wind tunnel.

U.S. Pat. No. 4,033,185, by McNally et al., discloses a wind tunnel simulator in which gas is forced through fixed passageways to interact with a tracer projectile. A motor is provided to impart motion to the projectile.

U.S. Pat. No. 3,866,467, by Horanoff, discloses a model support which utilizes a spherical air bearing and a plurality fiber optic cables associated with the air bearing for determining the relative position of the bearing and associated model.

U.S. Pat. No. 3,695,101, by Hanson, discloses a lift balance device. Static lift forces are balanced by the flow of pressurized air against a piston which slides loosely in a casing. This lift is measured by piston displacement.

U.S. Pat. No. 3,613,443, by Curry, discloses a large scale external balance which supports a model in a wind tunnel via a strut which is affixed to the floor of the wind tunnel.

U.S. Pat. No. 3,587,306, by Bryan, discloses a dampening system which is utilized in a wind tunnel.

U.S. Pat. No. 3,561,264, by Needham et al., discloses a link for connecting a model frame to a subframe which is attached to a wind tunnel floor.

U.S. Pat. No. 3,554,028, by Horanoff, discloses a pitch damping balance which utilizes a piston cylinder sliding cam mechanism to impart motion to a model mounted upon the balance.

U.S. Pat. No. 3,552,201, by Horanoff, discloses a roll moment balance. A fixed canted fin assembly is provided on the aft end of a model to impart rotational motion to the model and thus enable a roll moment to be determined.

U.S. Pat. No. 3,456,503, by Wise, discloses a free flight model launch assembly. This device utilizes a turbine for generating an initial spin on the model before launch.

U.S. Pat. No. 3,447,369, by Horanoff, discloses a model support structure which incorporates an air turbine. The air turbine is utilized to provide spin to the model.

For further information on wind tunnel design and captive model testing, please see:

"Rotary Balance Testing of Aircraft Dynamics", Report of Fluid Dynamics Panel Working Group 11, AGRAD Advisory Report No. 265; and "A Review of Techniques for Determination of Dynamic Stability Parameters in Wind Tunnels", AGRAD-LS-114, (1981).

The most obvious objective of simulating complex maneuvers is to explore the flow phenomena and forces which occur in the course of the motion. A second objective, subordinate to the first, is to turn a transient, one time maneuver into an event that can be precisely duplicated periodically. This would convert the transient flow measurement problem into periodic problem, amenable to advanced diagnostic systems which are now used in rotorcraft and compressor flows. When the rates of motion are converted from the full-scale flight environment to the equivalent rates for scale models in a wind tunnel, it is found that the rates are quite high and require large forces and moments. If the manipulator must perform these maneuvers independent of the aerodynamic forces acting on the model, a large, rigid manipulator arm is required. The aerodynamic forces and the large mass of the manipulator, even if economically feasible, becomes too massive in relation to the model and produces unacceptable flow interference in the wind tunnel. Thus, the manipulators described above would be incapable of performing these maneuvers.

SUMMARY OF THE INVENTION

It is therefore an object of the present invention to provide a dynamic manipulator for imparting motion to a model which is disposed within a wind tunnel.

It is a further object to provide a dynamic manipulator which will allow multiple degrees of motion or freedom to a model within a wind tunnel by adjusting the orientation of the dynamic manipulator.

It is yet another object to provide an ability to accurately position a model with respect to an oncoming air stream.

It is yet another object to provide a dynamic manipulator which will allow for the simulation of high rate maneuvers such as, but not limited to, "post stall" maneuvers.

It is yet another object to provide a manipulator which allows a large moment to be applied to a model by a very small aerodynamic surface, while moving the aerodynamic surface away from the model.

It is yet another object to provide advanced feedback control techniques to monitor model position and move the aerodynamic surface to precisely position the test model.

It is yet another object to provide a manipulator which will allow for an aerodynamic maneuver to be accurately performed more than once, thus allowing the possibility of learning controllers which accommodate such errors as deflection and other errors which occur.

It is yet another object to provide a manipulator which may be used as a versatile dynamic force and moment balance by measuring the position of an aerodynamic surface necessary to hold a model in a given position and compare this with manipulator calibration data.

It is yet another object to provide a wind driven manipulator which may be easily combined with conventional traverse or manipulator systems to increase the number of degrees of freedom.

Finally, it is an object of the invention to provide a manipulator which will allow for realistic simulation of motion of an aerodynamic body to allow aerodynamic investigations such as the determination of flow interactions, and forces and moments during transient maneuvers.

According to one broad aspect of the present invention, there is provided a one dimensional aerodynamic manipulator. The manipulator includes a support for supporting an aerodynamic body within a wind tunnel; a first aerodynamic surface affixed to the support in such a manner as to allow motion to be imparted to the aerodynamic body by an interaction between the first aerodynamic surface and a fluid flow within the wind tunnel; and a first control means for orienting the first aerodynamic surface with respect to the fluid flow.

According to another broad aspect of the invention, there is provided a multi-dimensional aerodynamic manipulator. This multi-dimensional aerodynamic manipulator includes a support for supporting an aerodynamic body within a wind tunnel; first and second aerodynamic surfaces affixed to the support in such a manner as to allow motion to be imparted to the aerodynamic body by an interaction between the aerodynamic surfaces and a fluid flow within the wind tunnel, the aerodynamic surfaces are orientated in different planes with respect to each other; first and second actuators are provided for imparting motion to the respective first, and second aerodynamic surfaces; a position encoder for generating a position signal representative of the position and orientation of the aerodynamic body; and a controller for receiving the position information, determining a desired orientation of the first and second aerodynamic surfaces, and for actuating the actuators to adjust the respective first and second aerodynamic surfaces to the desired orientation.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
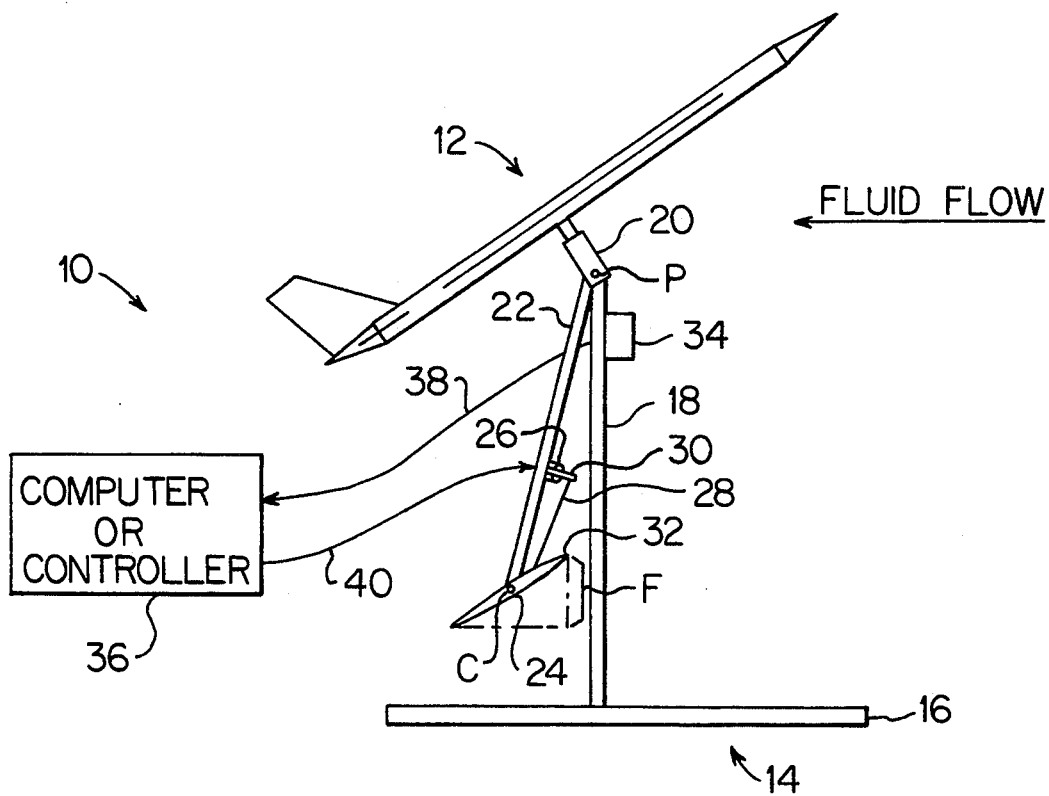
FIG. 1 is a side elevational view of a one dimensional wind driven manipulator constructed in accordance with a preferred embodiment of the invention.

With reference to the Figures, wherein like reference characters indicate like elements throughout the several views and, in particular, with reference to FIG. 1, a wind driven aerodynamic manipulator 10 is illustrated. As may be seen, an aerodynamic body or model 12 is supported within a wind tunnel (not shown) by a stand 14. Stand 14 is formed from a tubular base member 16 and a vertical support member 18 which is rigidly attached to base member 16. Stand 14 is commercially available. An attaching member 20 is pivotally attached to vertical support member 18 at pivot point P. A mounting arm 22 is an integral part of attaching member 20 and pivots about point P in relation to attaching member 20. It should be appreciated that pivot point P may be designed to allow for one degree of freedom or up to three degrees of freedom. One degree of freedom may be provided by use of a pin, or any other known fastening device allowing rotational motion about one axis, to secure attaching member 20. Three degrees of freedom may be provided by using a ball joint instead of a pin. It should also be appreciated that attaching member 20 may be designed to slide inside of support member 18. This would allow a sliding motion instead of or in addition to a pivotal or rotational motion.

Mounting arm 22 is provided for securing an aerodynamic surface 24 to both stand 14 and aerodynamic body 12. It should be appreciated that aerodynamic surface 24 may be of any shape, but preferably will have a parabolic shape, similar to the shape of a wing. Aerodynamic surface 24 has an axis C which extends into the paper as illustrated in FIG. 1. Surface 24 is disposed generally downstream of body 12. By placing surface 24 suitably far from body 12, with respect to fluid flow, flow disturbances generated by surface 24 will not effect aerodynamic data from body 12. Additionally, the downstream body 12 effects on fluid flow will not be effected by surface 24, unlike conventional manipulators.

The orientation of aerodynamic surface 24 may be adjusted by a motor or actuator 26. Motor 26 is commercially available. Motor 26 is preferably attached to mounting arm 22 in a conventional fashion. Motor 26 imparts motion to surface 24 via a rigid tubular member 28 or any other device known in the art. As may be seen, the geometric attitude of surface 24 with respect to the fluid flow, or the angle of attack may be adjusted by motor 26. This is accomplished by motor 26 rotating an arm 30. Tubular member 28 is affixed to arm 30 at one end and to surface 24 at point 32. Thus, when arm 30 rotates, tubular member 28 either pulls or pushes surface 24 up or down in a conventional fashion. By adjusting this footprint, i.e. the angle of attack of the aerodynamic surface, motion will be imparted to the aerodynamic body by the interaction between the fluid flow and the aerodynamic surface. This is caused by change in aerodynamic forces acting on aerodynamic surface 24 which in turn generates a moment about pivot point P. The moment at point P will be transferred to attaching member 20 and aerodynamic body 12. Thus, body 12 will pivot about point P. It should be appreciated that any device which imparts motion to or changes the attitude or shape of surface 24 may be utilized in place of motor 26 and member 28.

Figure 2:
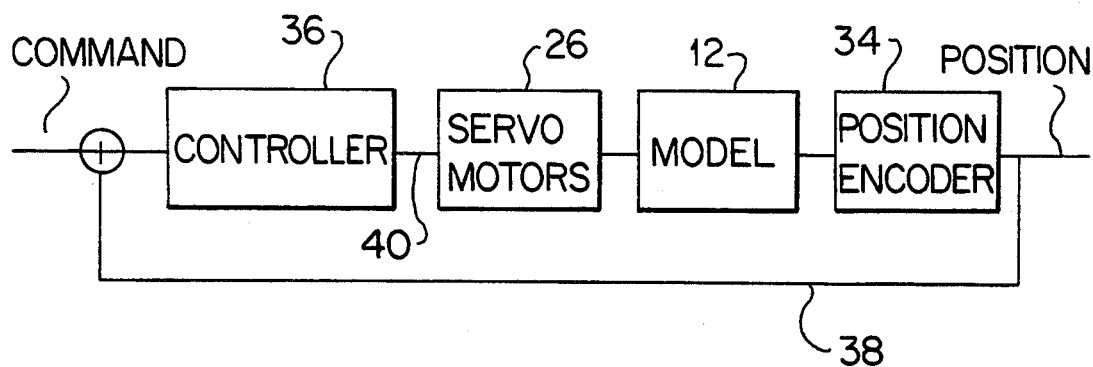
FIG. 2 is a block diagram of a control system for the manipulator of FIG. 1.

A position encoder 34 is provided for determining the orientation of aerodynamic body 12. Encoder 34 may also be utilized for determining the orientation of aerodynamic surface 24 or a combination of both body 12 and surface 24. Position encoder 34 is commercially available from BEI Motions and has series number MOD 5,000. This position information is transmitted to a computer or PC compatible computer controller 36 by communication line 38. Controller 36 is commercially available. As may be seen in FIG. 2, controller 36 receives this position information and determines a desired position or orientation for aerodynamic surface 24. Controller 36 then actuates motor 26 to reorient aerodynamic surface 24 to a desired orientation via communications line 40. Thus, aerodynamic body 12 will pivot about point P due to the interaction between reoriented aerodynamic surface 24 and the fluid flow as described above. Controller 36 achieves accurate positioning by a conventional feedback system as illustrated in FIG. 2. By providing motion to body 12 via aerodynamic surface 24, a smoother motion is generated. Thus, motor transients may be reduced in aerodynamic data acquired from body 12. Additionally, a more realistic motion may be simulated by body 12. It should be appreciated that a computer may be used in place of controller 36. It should also be appreciated that an open-loop feedback system may be incorporated in place of the closed-loop system described above.

Figure 3:
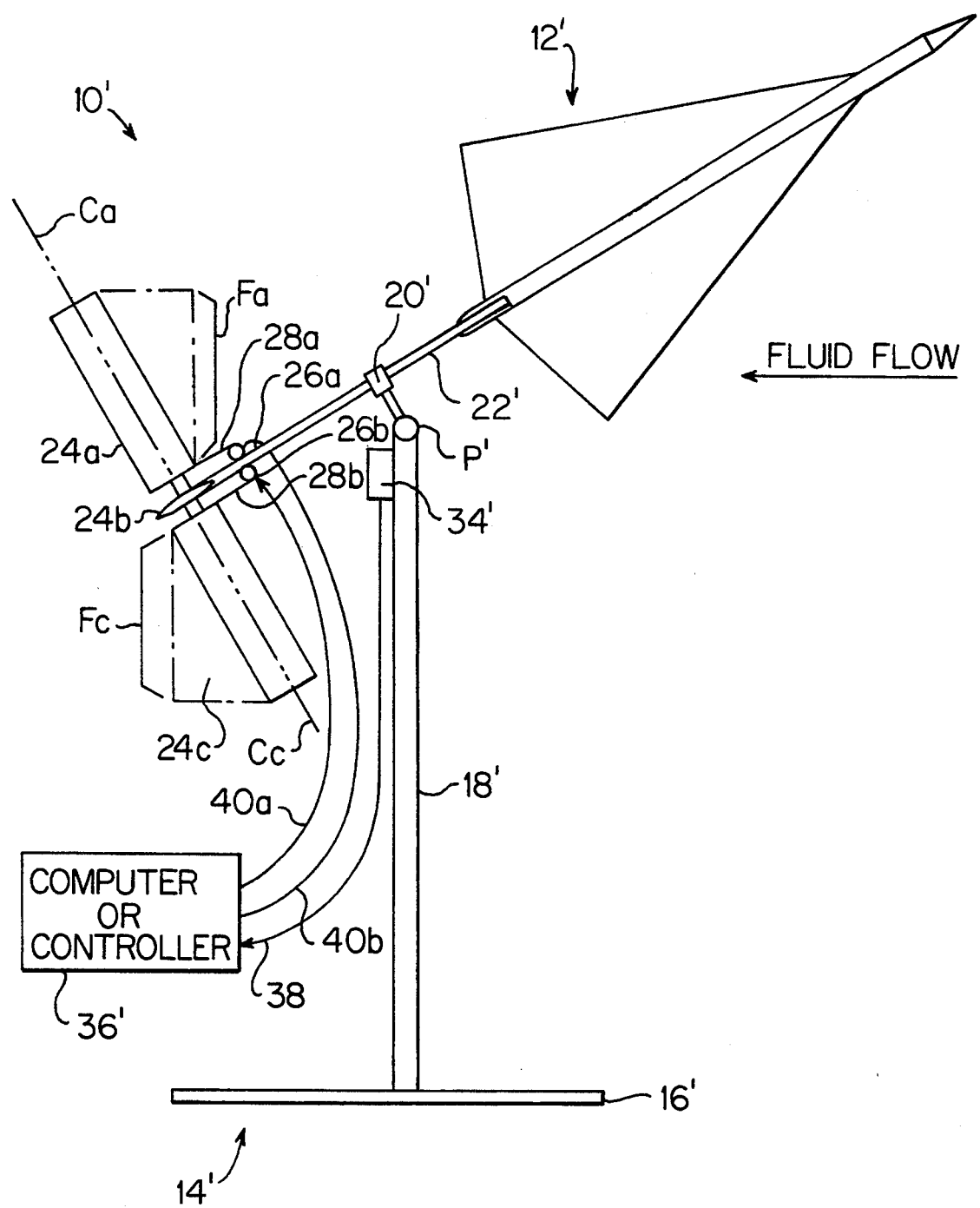
FIG. 3 is a side elevational view of a three dimensional wind driven manipulator constructed in accordance with a preferred embodiment of the invention.

Turning to FIG. 3, an alternate embodiment which allows three degrees of freedom is illustrated. For clarity, like elements have been provided with like reference numerals except that a prime has been added to each reference numeral. The following discussion will focus on the differences between elements of this embodiment and that of the preferred embodiment.

The primary difference in this embodiment is the addition of three other aerodynamic surfaces, the three visible surfaces being denoted 24a, 24b and 24c. It should be appreciated that there is a fourth surface 24d which corresponds to 24b and has not been illustrated for clarity. As may be seen, these four surfaces, 24a, 24b, 24c and 24d are orientated orthogonally with respect to each other. Thus, by controlling each respective surface and associated footprint Fa, Fb, Fc and Fd, three degrees of motion may be imparted to body 12'. For example by adjusting the yaw of surfaces 24a and 24c, the exposed surface area of footprints Fa and Fc will increase and in turn will generate an increased interaction with the fluid flow. This will cause a moment about pivot point P. Since body 12 is attached at point P, body 12 will rotate about point P in a similar fashion as described above. Thus the orientation of body 12 with respect to the fluid flow is accomplished. In a similar fashion, surfaces 24b and 24d may be adjusted and thus create a moment about each respective orthogonal axis. Surfaces 24a and 24c are controlled by motor 26a and rigid tubular member or rod 28a as described in the preferred embodiment. Surfaces 24b and 24d are controlled by motor 26b and rigid tubular member 28b as described in the preferred embodiment. Communication lines 40a and 40b provide communication between controller 36' and motors 26a and 26b, respectively, and in a similar fashion as communications line 40. Additionally, in this embodiment, mounting arm 22' and attaching member 20 are separate elements. Mounting arm 22' is not secured at pivot point P but is secured to attaching member 20' in a conventional fashion. In this embodiment, aerodynamic body 12' is secured to mounting arm 22' at an end distal from aerodynamic surfaces 24a, 24b, 24c and 24d.

While this embodiment illustrates the use of four aerodynamic surfaces, it should be appreciated that the same effect may be generated by using two aerodynamic surfaces which are disposed in different planes with respect to each other.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A wind driven dynamic manipulator for imparting motion to an aerodynamic body disposed within a wind tunnel, said manipulator comprising:

supporting means including a movable portion for supporting said aerodynamic body within said wind tunnel;

a first aerodynamic surface affixed to said supporting means in such a manner as to allow motion to be imparted to said aerodynamic body by an interaction between said movable portion of said first aerodynamic surface and a fluid flow within said wind tunnel; and a first control means for orienting said aerodynamic surface with respect to said fluid flow, said first control means for allowing said aerodynamic body to be dynamically positioned with respect to said fluid flow.

2. The manipulator recited in claim 1, wherein said support means comprises:

a frame assembly having a base;

an arm affixed to said base;

an attaching member for allowing said aerodynamic body to be affixed to said base, said attaching member affixed to said arm at a motion point; and said movable portion for allowing said aerodynamic surface to be affixed to said aerodynamic body, said movable portion affixed to said arm at said motion point in such a manner as to impart motion to said aerodynamic body with respect to said base.

3. The manipulator recited in claim 2, wherein said motion point allows motion in one degree of freedom.

4. The manipulator recited in claim 2, wherein said motion point allows motion in at least two degrees of freedom.

5. The manipulator recited in claim 2, wherein said motion is a pivoting motion.

6. The manipulator recited in claim 2, wherein said motion is a sliding motion.

7. The manipulator recited in claim 1, further comprising means for imparting rotational motion to said aerodynamic surface, thereby allowing a relative axial orientation of said aerodynamic surface to be adjusted with respect to an orthogonal axis.

8. The manipulator recited in claim 1, further comprising a second aerodynamic surface, said first and second aerodynamic surfaces being disposed in different planes with respect to each other, said aerodynamic surfaces being provided for allowing multiple independently controllable degrees of motion to said aerodynamic body.

9. The manipulator recited in claim 8, further comprising a second control means for controlling the orientation of said second aerodynamic surface while said first control means controls the orientation of said first aerodynamic surface, said first and second control means for allowing each respective aerodynamic surface to be adjusted with respect to said fluid flow, said second control means for allowing said aerodynamic body to be dynamically positioned with respect to said fluid flow.

10. The manipulator recited in claim 1, wherein said first control means comprises:

a first actuator for imparting motion to said first aerodynamic surface;

a position encoder for generating a position signal representing the position and orientation of said aerodynamic body; and a controller for receiving said position signal representing position and orientation, determining a desired orientation of said first aerodynamic surface, and for actuating said actuator to adjust said first aerodynamic surface to said desired orientation.

11. The manipulator recited in claim 9, wherein said first and second control means comprise:

first and second actuators for imparting motion to said respective first and second aerodynamic surfaces;

a position encoder for generating a position signal representing the position and orientation of said aerodynamic body; and a controller for receiving said position signal representing the position and orientation, determining a desired orientation of said first and second aerodynamic surfaces, and for actuating said actuators to adjust said respective first and second aerodynamic surfaces to said desired orientation.

12. A wind driven dynamic manipulator for imparting motion to an aerodynamic body disposed within a wind tunnel, said manipulator comprising:

supporting means for supporting said aerodynamic body within said wind tunnel;

first and second aerodynamic surfaces affixed to said supporting means in such a manner as to allow motion to be imparted to said aerodynamic body by an interaction between said aerodynamic surfaces and a fluid flow within said wind tunnel, said aerodynamic surfaces being orientated in different planes with respect to each other;

first and second actuators for imparting motion to said respective first and second aerodynamic surfaces;

a position encoder for generating a position signal representing the position and orientation of said aerodynamic body; and a controller for receiving said position signal representing the position and orientation of said aerodynamic body, determining a desired orientation of said first and second aerodynamic surfaces, and for actuating said actuators to adjust said respective first and second aerodynamic surface to said desired orientation.

13. The manipulator recited in claim 12, wherein said supporting means comprises:

a frame assembly having a base;

an arm affixed to said base;

an attaching member for allowing said aerodynamic body to be affixed to said base, said attaching member affixed to said arm at a motion point; and a mounting member for allowing said aerodynamic surface to be affixed to said aerodynamic body, said mounting member affixed to said arm at said motion point in such a manner as to impart motion to said aerodynamic body with respect to said base.

14. The manipulator recited in claim 13, wherein said motion point allows motion in at least two degrees of freedom.

15. The manipulator recited in claim 13, wherein motion at said motion point is a pivoting motion.

16. The manipulator recited in claim 13, wherein motion at said motion point is a sliding motion.

* * * * *